United States Patent
Prasse

[15] 3,698,054
[45] Oct. 17, 1972

[54] METHOD OF MAKING OIL CONTROL PISTON RINGS

[72] Inventor: Herbert F. Prasse, Town & Country, Md.

[73] Assignee: Ramsey Corporation, St. Louis, Mo.

[22] Filed: March 10, 1971

[21] Appl. No.: 122,798

[52] U.S. Cl..............................29/156.63, 29/156.6
[51] Int. Cl..............................................B23p 15/06
[58] Field of Search..........29/156.6, 156.62, 156.63; 277/141, 208, 75, 76, 215, 216, 235 A, 223, 224, 231

[56] References Cited

UNITED STATES PATENTS

| | | |
|---|---|---|
| 1,515,246 | 11/1924 | Ford.......................277/215 |
| 1,710,064 | 4/1929 | Mummert................29/156.63 |
| 1,856,279 | 5/1932 | Hellman..................29/156.63 |
| 2,099,712 | 11/1937 | Wilkening..............29/156.63 |
| 2,905,512 | 9/1959 | Anderson ..............29/156.6 X |
| 3,198,531 | 8/1965 | Brenneke...............277/215 X |
| 3,435,502 | 4/1969 | Thompson et al. .....29/156.63 |

Primary Examiner—John F. Campbell
Assistant Examiner—Victor A. DiPalma
Attorney—Hill, Sherman, Meroni, Gross & Simpson

[57] ABSTRACT

A method of making oil control piston rings having inner diameter and outer diameter central channels with oil drainage slots spaced apart circumferentially communicating the channels, the outer diameter having axially spaced apart scraping beads with radial grooves therein filled with a hard facing metal. The method includes the sequential steps of making a cast unsplit ring, providing axially spaced-apart radial grooves in the outer diameter of the ring, providing an internal inner diameter channel in the said ring, forming blind oil drainage slots in the inner diameter of the ring, spray-coating stacked rings on the outer diameter with a hard-faced coating, machining the stacked rings on the outer diameter to remove the coating except in the area of the outer diameter grooves, forming an outer diameter channel on the ring thereby opening the blind oil slots and forming bevels on the axial ends of the outer diameter of the ring and thereafter splitting the ring axially.

3 Claims, 20 Drawing Figures

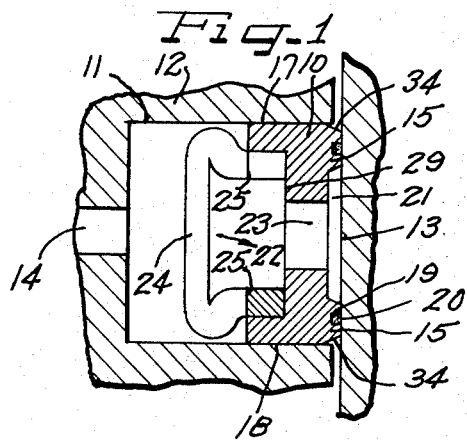
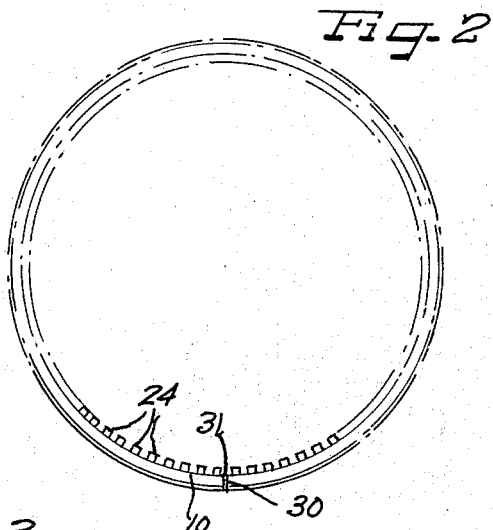
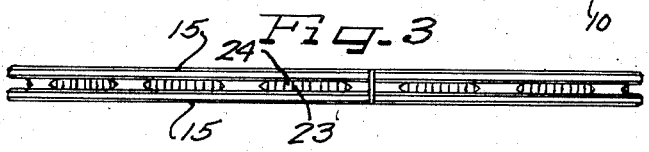
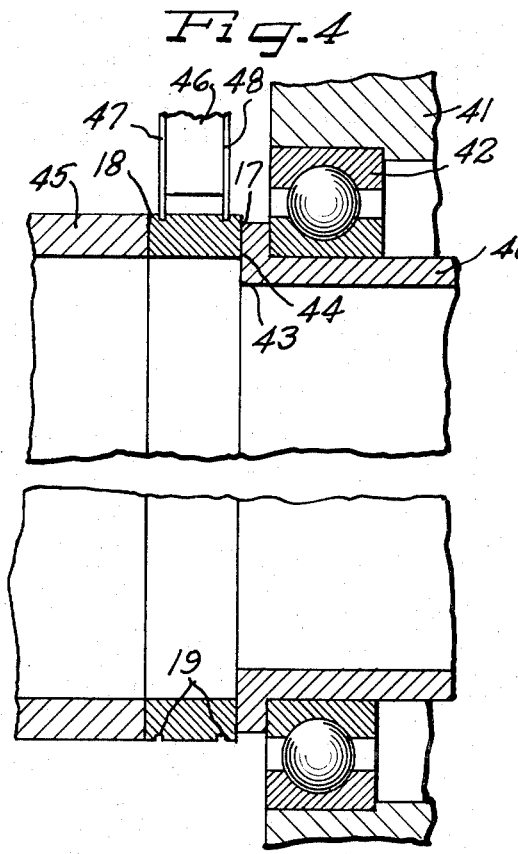
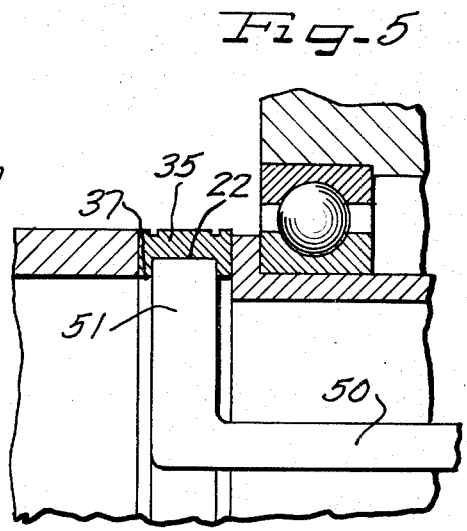
INVENTOR.
Herbert F. Prasse

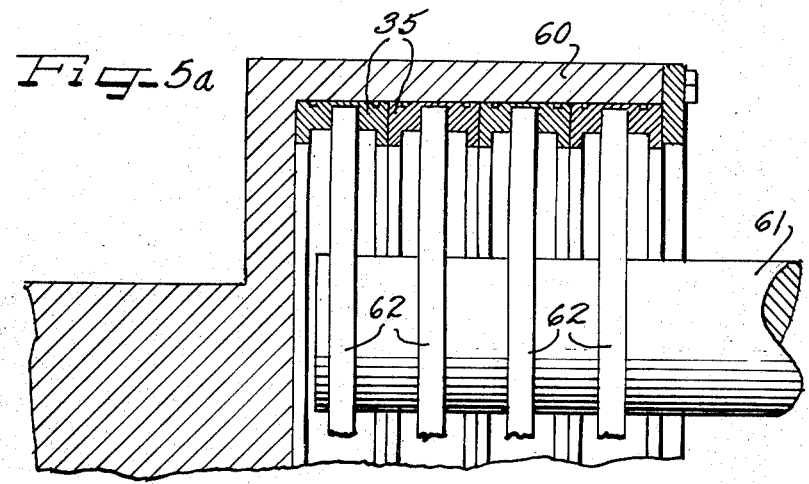
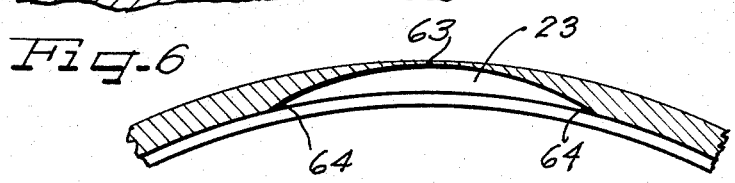
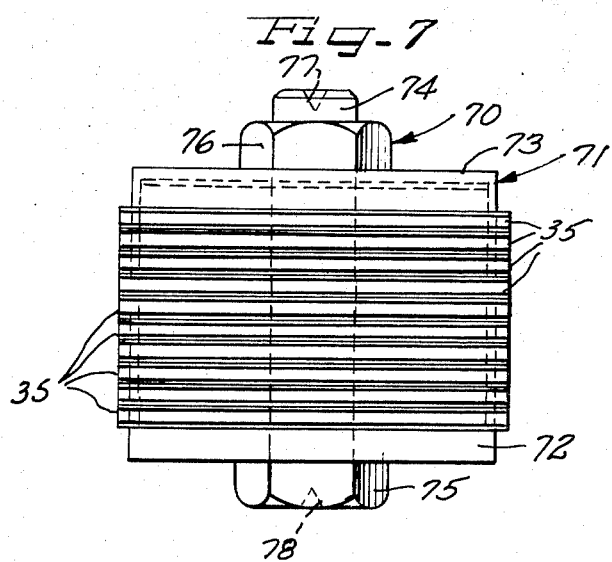
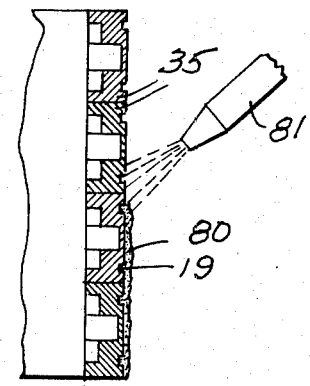
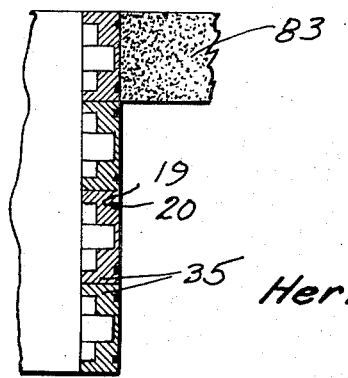

PATENTED OCT 17 1972 3,698,054
SHEET 3 OF 3
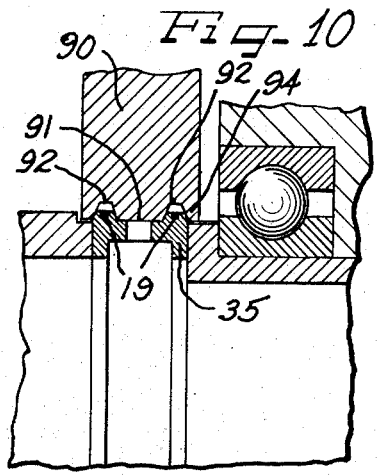
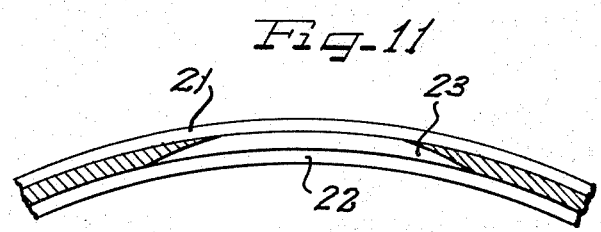
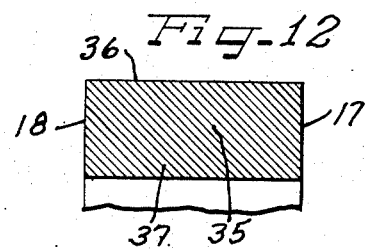
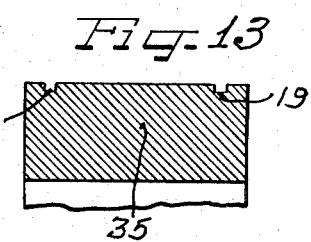
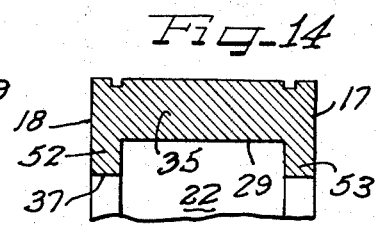
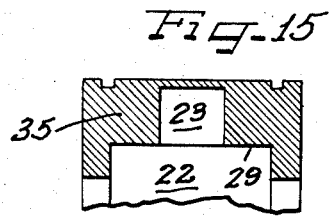
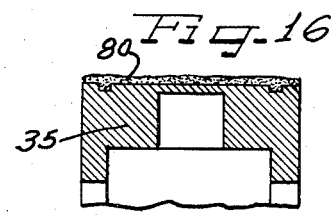
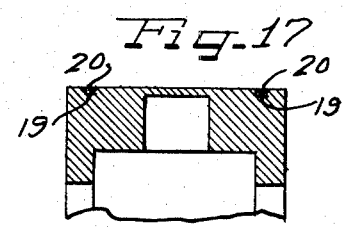
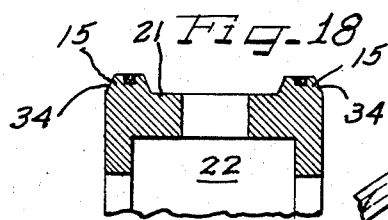
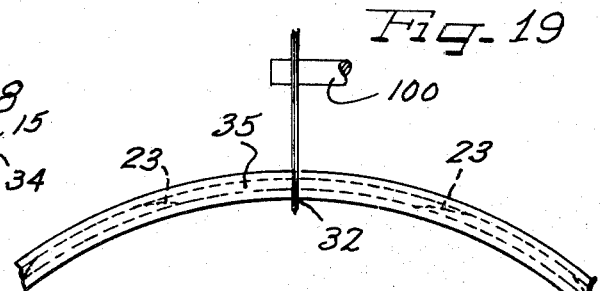
INVENTOR.
Herbert F. Prasse
BY Hill, Sherman, Meroni, Gross & Simpson ATTORNEYS

METHOD OF MAKING OIL CONTROL PISTON RINGS

BACKGROUND OF THE INVENTION

1. Field of the Invention

This invention relates to piston rings and more particularly to a method of forming an oil control piston ring.

2. Prior Art

It is known to employ an oil control ring between a cylinder and a piston reciprocating therein, which ring engages the cylinder on both sides of a central radial channel and has slots therethrough so that drainage can occur from the cylinder through the ring and through conventional drainage or smoke holes in the piston to the interior thereof.

Rings according to the present invention are one-piece slotted channel oil control rings having narrow peripheral bands of porous wear resistant metal applied thereto.

Such prior art rings are evidenced by the U. S. Pat. No. 3,435,502 to Thompson et al. The prior art rings such as these are generally constructed of split ring blanks which are placed on an arbor and worked from the exterior thereof except for the forming of an inner channel.

The prior art manufacturing techniques used have numerous disadvantages, including the problems of proper spacing of the oil drainage slots on a split ring, problems associated with weakening of the ring blank at various steps in the process and the disadvantageous necessity of stacking and restacking rings on arbors.

SUMMARY OF THE INVENTION

This invention overcomes these disadvantages by providing a sequential method for the production of such rings wherein in the preferred embodiment, the rings are not split until after the majority of other operations has been performed thereon. This assures ring stability during the necessary machining and/or grinding operations.

Additionally, the oil slots are provided from the inner diameter out which produces an advantageous ring design less susceptible to oil clogging than rings produced by prior methods.

The invention includes the sequential steps of providing a ring blank of rectilinear cross-sectional configuration having inner and outer diameter circumferential walls and axially spaced radially extending end walls.

Thereafter, the following sequential operations are performed upon the ring:

a. A pair of axially spaced-apart radially narrow grooves are formed in the outer diameter;

b. A central inner diameter radially extending channel is formed in the inner diameter wall;

c. A plurality of circumferentially spaced radial slots are formed in the inner diameter wall of the inner diameter groove, the slots terminating within the material of the ring;

d. A wear-resistant facing is applied to the outer diameter of the ring;

e. The wear-resistant facing is ground off the outer diameter of the ring except for the grooves;

f. An outer diameter radially extending axially centrally located channel is formed, communicating to the oil drainage slots, and the axial end outer diameter corners are bevelled;

g. The ring is split.

Steps (d) and (e) may be performed immediately after step (a) if desired.

It is therefore an object of this invention to provide an improved method for manufacturing an oil control ring.

It is another and more important object of this invention to provide an improved method of manufacturing an oil control ring having inner and outer diameter channels with circumferentially spaced oil drainage slots communicating with the channels, the slots formed from the inner diameter of the ring.

It is yet another and more important object of this invention to provide an oil control ring having outer diameter axially spaced-apart scraping beads with grooves of wear-resistant material therein, an inner diameter channel and oil slots communicating the outer periphery to the inner diameter, wherein the ring is produced from a ring blank, the ring blank having a plurality of operations performed thereon and the ring blank remaining unsplit until a majority of such operations are performed.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a fragmentary cross-sectional view of a piston received in a cylinder, the piston having a ring groove with an oil control ring formed according to a method of this invention;

FIG. 2 is a fragmentary top plan view of the oil control ring of this invention;

FIG. 3 is a plan view of the oil control ring of this invention;

FIG. 4 is a fragmentary diagrammatic view of the grooving operation in the method of this invention;

FIG. 5 is a fragmentary diagrammatic view of the inner diameter channel forming operation of the method of this invention;

FIG. 5a is a fragmentary diagrammatic view of the slot forming operation of the method of this invention;

FIG. 6 is a fragmentary cross-sectional view of a ring produced after the step illustrated in FIG. 5;

FIG. 7 is a plan view of a plurality of rings received on an arbor prior to the operations illustrated in FIGS. 8 and 9;

FIG. 8 is a fragmentary diagrammatic cross-sectional view of the coating operation of this invention;

FIG. 9 is a fragmentary view similar to FIG. 8 illustrating the facing removal operation of this invention;

FIG. 10 is a fragmentary diagrammatic view of the outer channel and bevel forming operation of this invention;

FIG. 11 is a cross-sectional fragmentary view of a ring produced according to the method of this invention after the step of FIG. 10;

FIGS. 12 through 18 are fragmentary cross-sectional views of a ring produced according to the teachings of this invention illustrating the individual steps performed thereon.

FIG. 19 is a diagrammatic view illustrating the ring splitting operation.

DESCRIPTION OF THE PREFERRED EMBODIMENT

FIG. 1 illustrates an oil control ring 10 received in the oil ring groove 11 of a piston 12 received in a cylinder 13 of an engine. The piston 12 has an oil drainage and smoke hole 14 communicating with the back of the groove 11 and the interior of the piston.

The ring 10 has a pair of axially spaced-apart oil scraping beads 15 formed by radially extending circumferential projections adjacent the axial end walls 17 and 18 of the ring 10. The beads 15 have circumferential grooves 19 therein filled with hard-facing metal 20. The ring 10 has an outer diameter central channel 21 formed as a circumferential recession in the outer diameter of the ring between the beads 15. An inner diameter channel 22 is also provided and communicates with the outer diameter channel 21 through a plurality of circumferentially spaced-apart oil drainage holes 23. A circumferential expander ring 24 is received in the groove 11 and has radially projecting leg portions 25 received in the channel 22 and abutting the inner diameter wall 29 of the channel 22 axially beyond the oil slots 23.

As illustrated in FIG. 2, the ring 10 is split at 30, providing gap ends 31, thereby allowing the ring 10 to expand and contract circumferentially, increasing or decreasing the gap 30. In the preferred embodiment, the outer peripheral axial corners 34 of the ring 10 are bevelled.

The ring 10 is constructed according to the method of this invention. First, a ring blank, as illustrated in FIG. 12, is provided. The blank 35 is ring-shaped, having in cross section an outer diameter wall 36, an inner diameter wall 37 and axial end walls 17 and 18. The axial end walls 17 and 18 are radial. The first step normally performed on the ring blank is to machine the axial end walls 17 and 18 to the desired radiality and to machine the ring to the desired width.

Thereafter, the ring blank 35 is placed in a single ring turning machine such as is illustrated in FIG. 4. The single ring turning machine includes a hollow-shafted member 40 received in a housing 41 in relative rotation therewith through a bearing assembly 42. One end 43 of the hollow shafted member 40 has a radial wall 44 which contacts an axial end wall 17 of the ring blank 35. A rotatable drive member 45 presses against the other axial end 18 of the ring blank 35 and rotates the ring with respect to the housing 41. Thus, the ring blank 35 is enclamped between the drive member 45 and the hollow shafted member 40 and rotates therewith. The ring blank 35 is accessible to tools on the outer or the inner diameter. Inasmuch as the ring blank 35 is unsplit during the performance of the operation illustrated in FIG. 4 and other figures utilizing the single ring turning machine, such tools may work on the inner or outer diameter of the ring blank without fear of circumferential collapse of any portion of the ring such as could be encountered with a split ring where the gap at the split could decrease during operation of a tool on either the inner or outer diameter thereof, thereby adversely affecting the operation being performed on the ring.

After machining the ring to size to produce the blank illustrated in FIG. 12, the ring is inserted in the single ring turning machine and the circumferential outer diameter grooves 19 are formed. As illustrated in FIG. 4, they may be formed by a double headed tool 46 which has a pair of axially spaced-apart machining edges 47 and 48 projecting therefrom. The machining edges 47 and 48 preferably have an axial thickness dimensioned to provide a groove of the desired thickness in an axial direction. The tool is radially movable with respect to the hollow sleeve 40 of the turning machine to cut the grooves to the desired radial depth. The grooves 19 are axially spaced apart and are formed a given distance from the axial ends 17 and 18 of the ring blank.

Next, as illustrated in FIGS. 5 and 14, a cutting tool 50 is inserted into the single ring turning machine from the interior thereof. The cutting tool 50 has a cutting head 51 dimensioned to cut the inner diameter channel 22 into the inner diameter wall 37 of the ring blank 35. The inner diameter channel 22 is centrally positioned between the ends 17 and 18 of the ring blank 35, leaving radially inwardly directed lands 52 and 53 defining the axial ends of the channel 22 and an axial peripheral wall 29 at the bottom of the channel.

Next, as illustrated in FIGS. 5a and 15, the oil drainage slots 23 are formed from the inner diameter wall 29 of the groove 22 into the material of the ring blank 35. For this operation, the ring blanks 35 may be removed from the single ring turning machine and stacked in a cup-shaped arbor 60 in end-to-end relation as illustrated in FIG. 5a. In such a case, the oil drainage slots 23 may be formed by a multi-headed tool 61 which extends into the inner diameter of the cup-shaped arbor 60 and which has a plurality of cutting or machining heads 62 thereon which have a diameter smaller than the diameter of the ring. The axis of the tool 61 is movable and is positioned off-center from the axis of the arbor 60 whereby the slots 23 are arcuately cut into the material of the ring 35, each slot, as illustrated in FIG. 6, being deeper into the material of the ring body 35 at its centerpoint 63 than at its circumferential end 64. In a preferred embodiment, the tool heads 62 are tapered to form a wedge shaped slot whereby all of the walls of the slot diverge from the outer side of the ring to the inner side. The slots 23 are cut a given depth into the material of the ring body 35 without breaking through the outer periphery 36 thereof. Thus, initially the oil drainage slots 23 are formed blind, open only to the inner diameter of the ring. The slots 23 are preferably axially narrower than the channel 22, and are centered on the bottom wall 29 of the channel, thereby providing axial ledge faces on the bottom wall 29 of the channel 22 for abutment with the expander 24.

Next, the rings 35 are placed upon an arbor in stacked relation as illustrated in FIG. 7. The arbor 70 comprises a mandrel 71, an enlarged shoulder 72 integral with one end of the mandrel, a cap 73 at the other end of the mandrel, a bolt 74 having an enlarged head 75 and a nut 76 threaded onto the bolt. The stack of ring blanks 35 fits over the mandrel 71 and is enclamped between the shoulder 72 and the cap 73 by means of the bolt 74 and nut 76, the bolt going through the mandrel 71, the bolt head engaging the shoulder 72 and the nut engaging the cap 73. The ends of the bolt 74 have suitable indentations 77 and 78 which facilitate mounting the arbor 71 on suitable driving means (not shown) for rotating the arbor and the stack of ring blanks 35. After mounting the blanks on the arbor, the blanks are spray-coated with a suitable long-wearing facing material 80 as illustrated in FIGS. 8 and 16.

In the preferred embodiment, the blanks are coated by flame spraying from a flame spray apparatus 81 to a depth sufficient to adequately coat all of the rings thereby assuring deposition of the material 80 in the grooves 19. During the spraying operation, the arbor 71 may be rotated. After flame spraying, the rings on the arbor are next subjected to a machining wheel 83 best illustrated in FIG. 9. The wheel 83 is applied to the exterior of the stack of ring blanks 35 so that the excess of the flame sprayed material 80 is removed and such metal is left only in the grooves 19, thereby providing the facing 20 in the grooves 19 as illustrated in FIG. 1.

Next, the rings are removed from the arbor and returned to the single ring turning machine as illustrated in FIG. 10 where they are engaged by a tool 90 having a cutting or machining face 91 with two bevelled grooves 92 therein aligned with the grooves 19 of the ring blank 35. The cutting or machining tool 90 is then used to form the outer diameter channel 21 centrally in the outer diameter of the ring, thereby providing the scraping beads 15 at either end of the channel. Further, the axially outer sides 94 of the grooves 92 in the tool form bevelled edges 34 on the axially outer ends of the scraping beads.

The formation of the channel 21 breaks through to the bottom of the oil drainage slots 23 thereby communicating the slots 23 to the channel 21 at least over a portion of the central portion of the slots 23 as is best illustrated in FIG. 11. The central portion of the slots 23 are each open to the outer diameter of the channel while the entirety of the slots 23 are open to the inner diameter channel 22. In this manner, the slots increase in size from the outer diameter to the inner diameter, thereby providing better oil flow. In prior art rings where the slots have been formed from the outer diameter rather than from the inner diameter, the slots have decreased in area from the outer to the inner diameter, thereby allowing buildup of sludge and restricted flow.

Next, the ring blanks 35 are slotted as by a cutting tool 100 diagrammatically illustrated in FIG. 19. The slots are dimensioned so as to provide the desired gap 32. It will be appreciated that at this point, a completed oil control ring is formed which may, if desired, be subjected to further operations such as deburring, polishing and/or phosphate coating.

Where it is desired to introduce the ring to the single ring turning machine with the same alignment in each step, an identification pip or mark may be placed on one of the faces 17 or 18 at or prior to the grooving operation illustrated in FIG. 1. The pip will then serve to identify one side of the ring for introduction into the machine and may further serve to identify the top of the ring for installation in the ring groove.

It will therefore be appreciated that my invention illustrates a method of producing an oil control ring having inner and outer diameter channels communicated by oil slots whose walls diverge from the outer to the inner diameter, the outer periphery of the ring having axially spaced-apart scraping beads at the axial ends of the outer channel, the beads having hard facing metal filled grooves therein.

It is essential to my invention that the inner diameter channel and the oil slots be formed prior to the outer diameter channel. In this manner, the oil slots are always formed blind into the material of the ring blank, and thereafter are open during formation of the outer channel. If desired, the application of the facing metal and the machining of the facing metal may be accomplished prior to formation of the inner diameter channel and the blind oil drainage slots. However, facing and machining of the facing should always be done prior to formation of the outer diameter channel. It is further essential to my invention that the ring blanks remain unsplit at least until after the completion of all inner diameter cutting and grinding operations. It is preferable that the ring remain unsplit until after the outer diameter channel has been formed, breaking through to the oil drainage slots. It will be appreciated that by maintaining the ring in an unsplit condition, formation of the oil drainage slots is simplified. In prior art embodiments where the ring was split as an initial step or prior to the formation of the oil drainage slots, it was necessary to specifically align the ring blanks with respect to the tool used to form the oil drainage slots so that the slots were not formed in the area of the gap. By splitting the ring after the slots have been formed, it is relatively simple to cut the ring at a point between adjacent slots, thereby maintaining the strength of the ring at the gap.

Although I have herein set forth my invention with respect to certain specific principles and details thereof, it will be understood that these may be varied without departing from the spirit and scope of the invention as set forth in the hereunto appended claims.

I claim as my invention:

1. The method of making an oil control ring from an unsplit ring blank comprising the sequential steps of: forming two peripheral grooves in the periphery of the blank, then cutting an interior channel in the inner periphery of the blank, then machining a plurality of slots from the interior of the channel radially outward without communicating the slots to the outer periphery of the blank, then coating the exterior of the blank with porous wear-resisting metal filling the said grooves with the said metal, then machining away the metal coating to remove it from the ungrooved portions of the periphery, leaving the grooves filled with metal, then cutting an outer diameter central radially extending channel into the periphery of the ring, the bottom of said channel communicating with the said slots, and forming bevelled edges at the axial ends of the outer periphery, and then cutting through the ring axially to split it.

2. The method of making an oil control ring comprising the steps of, first, forming an unsplit ring blank having inner and outer diameters and axial end walls, then forming axially spaced-apart radial grooves in the outer diameter of said ring in a single ring turning machine, then forming an inner diameter channel radially outwardly from the inner periphery of said ring in a single ring turning machine, then forming a plurality of circumferentially spaceddapart radius bend slots in the said ring radially outwardly from the inner diameter of the said inner diameter groove, the said slots being formed blind and not communicating to the outer diameter, then coating the outer diameter of the said ring with a facing metal filling the said grooves, then removing the said facing metal from the said outer diameter except in the said grooves, then forming an outer diameter channel radially inwardly in the said ring communicating with the said slots, the said outer diameter channel being formed intermediate the said outer diameter grooves, then axially splitting the said ring.

3. In the method of making an oil control ring which has inner and outer diameter circumferential channels communicated by a plurality of circumferentially spaced-apart oil drainage slots, the improvement of forming the inner diameter channel first, forming the oil drainage slots blind into the material of the ring, the slots increasing in size towards the inner diameter and thereafter forming the outer diameter channel to a depth sufficient to communicate to the bottom of the slots, the ring blank remaining unsplit at least until after formation of the blind oil drainage slots.

* * * * *